United States Patent [19]

Cipriani

[11] 4,236,541

[45] Dec. 2, 1980

[54] APPARATUS FOR WASHING AND DRYING FOOD PRODUCTS

[75] Inventor: Tullio Cipriani, Parma, Italy

[73] Assignee: Hoonet s.a.s. di Indro Paolo Dall' & C, Varese, Italy

[21] Appl. No.: 35,552

[22] Filed: May 3, 1979

[30] Foreign Application Priority Data

May 4, 1978 [IT] Italy ............... 40068 A/78

[51] Int. Cl.³ ............... B08B 3/02; B08B 3/06
[52] U.S. Cl. ............... 134/104; 134/112; 134/140; 134/153; 134/155; 99/516
[58] Field of Search ............... 134/104, 112, 140, 148, 134/153, 155, 159, 200; 99/516, 536

[56] References Cited

U.S. PATENT DOCUMENTS

| | | | |
|---|---|---|---|
| 694,501 | 3/1902 | Treadway | 99/516 X |
| 1,289,326 | 12/1918 | Walker et al. | 134/142 X |
| 1,290,396 | 1/1919 | Steere | 134/153 X |
| 2,965,111 | 12/1960 | Feigelman | 134/155 X |
| 3,338,251 | 8/1967 | Nobili | 134/148 X |
| 3,909,291 | 9/1975 | Leong | 134/104 X |
| 3,949,772 | 4/1976 | Hartmann | 134/200 X |
| 4,142,541 | 3/1979 | Bossert et al. | 134/159 X |

*Primary Examiner*—Robert L. Bleutge
*Attorney, Agent, or Firm*—Browdy and Neimark

[57] ABSTRACT

The invention relates to an apparatus for washing and drying vegetables and fruit. It includes a closed prism-shaped container in which is housed a rotatable cylindrical container provided with a plurality of passage holes. After the vegetables or fruit have been introduced into the rotatable container, water is introduced by an injector creating a turbulence that stirs and washes the vegetables or fruit by removing the impurities. When the washing is completed, the water contained in the container is emptied and the rotatable container is put into motion which thus dries the washed products by centrifugal force.

8 Claims, 4 Drawing Figures

APPARATUS FOR WASHING AND DRYING FOOD PRODUCTS

FIELD OF THE INVENTION

The object of the present invention is an apparatus for washing and drying food products, vegetables in particular and fruit in general.

BACKGROUND OF THE INVENTION

At the time of direct consumption or sending into the processing cycles for canning, it is necessary, for health reasons, to wash vegetables and fruit in general since these products are often associated with various extraneous bodies, insects, dirt, chemical substances as for example, antiparasitic agents or fertilizers, etc. After the washing operation, a drying operation is performed for those products that need it. In households, washing of these products is normally performed by hand by putting the products directly into the water, while for those products that need it (for example, salads), drying can be performed, for example, by perforated baskets rotated by various systems, which hold the product and allow the exit of drops of water to the outside by centrifugal force due to the rotation of the basket.

Besides the fact that the person is forced to keep his hands in cold water, this system has the disadvantage of requiring much time to perform an accurate washing of said products which further has the disadvantage, particularly for greens, of impoverishing the vitamin and mineral components contained in them caused by the long stay of the greens in the water; this system further has the advantage of having to remove the products from the container where they are washed and put them in baskets to perform the drying.

In industry, and generally when the amounts of products to be washed are considerable, there are washing vats in which water is made to circulate to create turbulent movements; the products, immersed in these vats, are agitated and stirred by the turbulence of the water itself and in this way washing of the products is performed.

For drying, the products are removed from the washing vats and put into a perforated rotating basket in which, by centrifugal force, this operation is performed.

Besides the not inconsiderable fact of involving a loss of time to remove the products from the washing vats and transport and place them into rotating baskets for drying, this system has the drawback of requiring two different apparatus to perform the operations described above.

SUMMARY OF THE INVENTION

The purpose of this invention is to eliminate the drawbacks described above by providing a single apparatus which performs both operations of washing and drying described above.

A further purpose of this invention is to achieve an apparatus which, with merely obvious differences in size, drive and possibly the materials used for construction, can meet household, community or restaurant and industrial needs.

Another purpose of this invention, particularly for the embodiment for domestic use, is to perform an effective and thorough washing of the product in a relatively short time.

These and still other purposes will be achieved by the apparatus in question of the type comprising: a first stationary container equipped with first and second means for discharging the water; a second container housed inside the first and equipped with means for putting it into rotation around a stationary axis; a plurality of through passages provided on the surface of said inside container; ejection means connected to a source of water under pressure, housed on the inside of the stationary container, suitable for sending into the inside container a stream of water having such velocity as to produce a swirling, turbulent movement within the inside container; the first water discharge means being suitable for maintaining inside the stationary container a predetermined constant water level; the second discharge means being suitable for regulating the change of water during the washing phase and discharging the water from the apparatus after the last washing.

Further characteristics and advantages of the invention will be brought out better from the following detailed description which follows a preferred by not exclusive embodiment of the apparatus in question, shown purely by way of non-limiting example in the accompanying drawings.

DETAILED DESCRIPTION OF THE PREFERRED EMBODIMENTS

Figure 1:
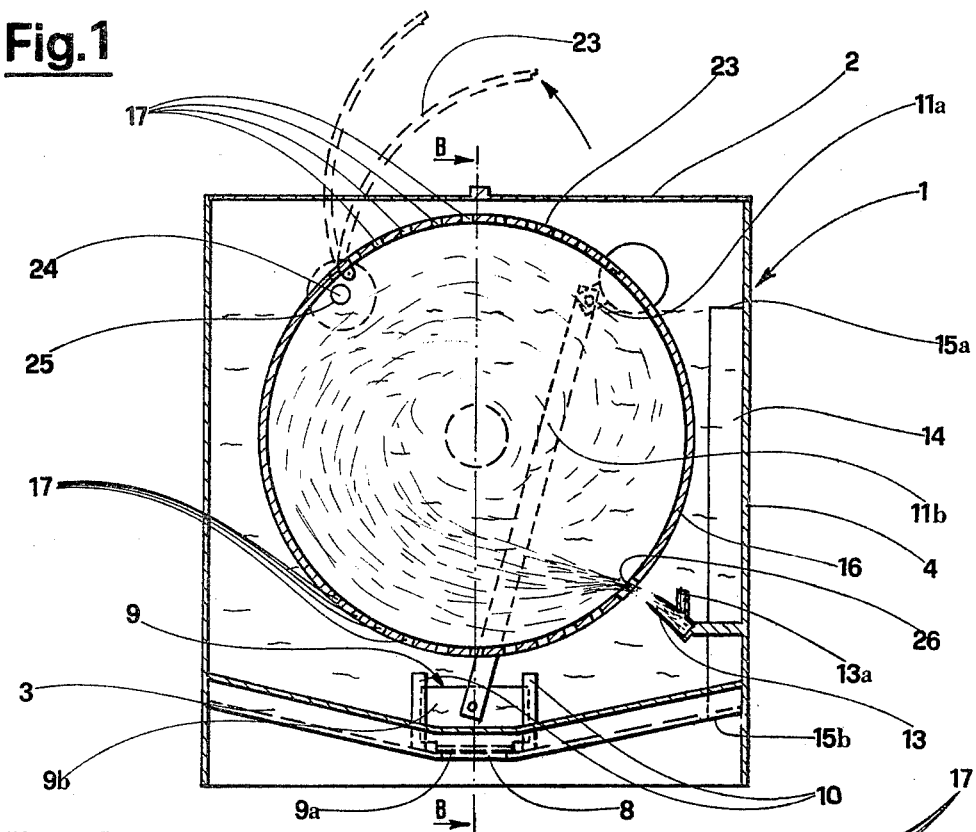
FIG. 1 shows a side view in vertical elevation of a first embodiment of the apparatus in question in a section along the plane of line A—A.
Figure 2:
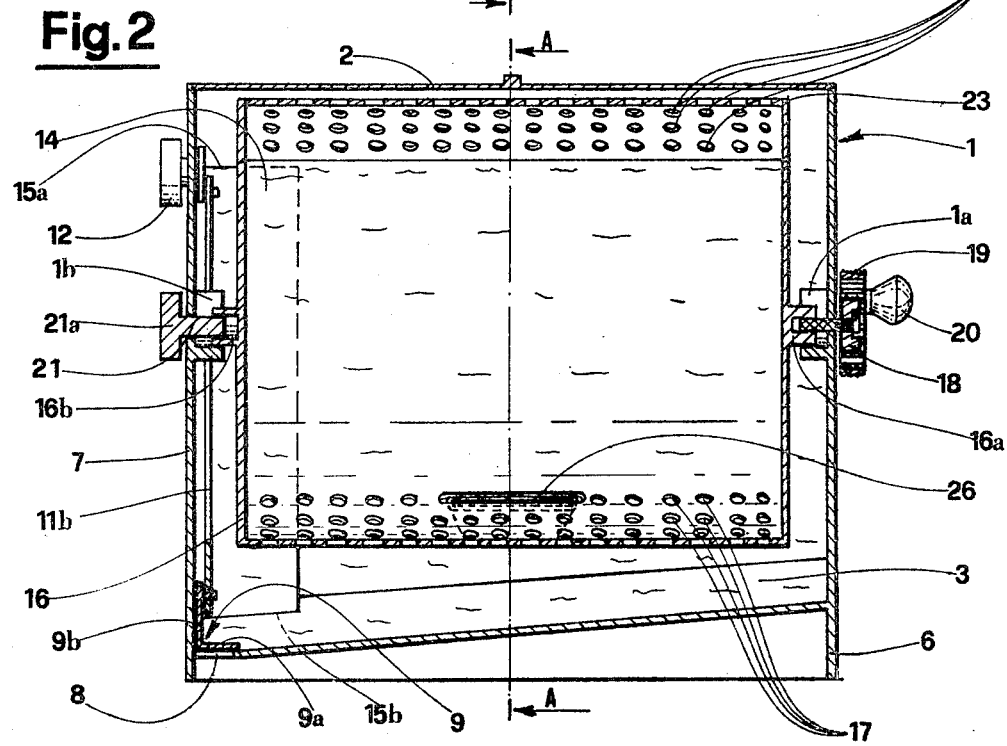
FIG. 2 shows a front view in vertical elevation of a first embodiment of the apparatus in question along the plane of line B—B

A first embodiment of the apparatus in question, particularly provided for domestic use and illustrated in FIGS. 1 and 2, comprises a stationary container 1, substantially in parallelepipedic shape, on which open upper face rests a cover 2. Bottom 3 of container 1 comprises two slopes converging downward in the middle which in turn is sloped.

The apparatus in question further comprises a first water discharge means suitable for keeping in container 1 a constant predetermined water level; this means comprises a vertical conduit 14 fastened to a side wall 4 of container 1, which is connected with the inside of container 1 by a first discharge slot 15a and on the outside of the device by a second discharge or exit slot 15b. There is further provided a second discharge means suitable for regulating the change of the last wash water; this discharge means comprises a discharge hole 8 made in a lower point of the bottom 3, discharge of the water by the hole 8 being regulated by a closing element 9 that can be moved between two vertical guides 10 formed internally along wall 7; the element 9 comprises a horizontal plate 9a suitable for covering over closing hole 8 and a vertical plate 9b rigidly connected to plate 9a; the edges of the plate 9b perpendicular to the edge connected to plate 9a are connected to slide inside the guides 10 and guide the movement of element 9. Element 9 is moved in translation by an articulated system that comprises a first arm 11a, rigidly connected with knob 12 placed on the outside wall 7, and able to rotate around a horizontal stationary axis; the articulated system also comprises a second arm 11b hinged, at one end, to arm 11a and at the other end to plate 9b of closing element 9.

The apparatus in question further comprises ejection means including an ejector 13 rigidly connected to the lower part of wall 4 of the stationary container 1, shaped so as to provide an outflow slot with an axially elongated shape so as to eject a stream of water in the form of a sheet; the ejector 13 can be connected, by intake conduit 13a to a source of water under pressure (not shown in the figure) for example, to a tap connected to water system. The apparatus in question further comprises an inside container made up of a cylindrical basket 16, on whose side surface is provided a plurality of through holes 17, supported in a rotatable manner by stationary container 1; the basket 16 is provided with two pins 16a and 16b rigidly and axially connected, each at a base, to the bases of the basket 16; pins 16a and 16b are housed respectively in two seats 1a and 1b made in the walls 6 and 7 of container 1. A door portion 23 of the lateral surface of basket 16 can be moved e.g. about a hinge, an open slot for access to the inside of the basket as shown in phantom in FIG. 1. Basket 16 is provided with an opening 26 for passage of the water, having an axially elongated shape, formed in the lateral surface of the basket; the opening 26 is made to allow passage of water that comes from the ejector 13.

The apparatus in question further comprises means suitable for putting basket 16 in rotation around a stationary horizontal axis; the means comprise a first gear wheel 18, coaxial and solid with the rotation of basket 16 by a prismatic hole made in pin 16a, in which engages a prismatic appendix solidly connected with the gear wheel 18; a second gear wheel 19, which meshes with gear wheel 18, supported in a rotatable manner by container 1, is put in motion, around an axis parallel to the axis parallel to the axis of the basket 16, by manual action on handle 20.

A first cylindrical pin 21, whose insertion from the outside into a cylindrical hole in pin 16b is made possible by a hole made in wall 7 of container 1, imparts to the basket 16 the exact axial position and prevents the basket from making any movements except that of rotation around its own axis. The outside end of the pin is made up of a knob 21a to facilitate insertion and removal of the pin.

On a flat wall of basket 16 facing wall 7 of outside container 1 and on said wall 7 are made, one in each wall, two coaxial holes 24 in which it is possible to insert, from the outside, a locking means made up of a second cylindrical pin 25 that prevents any relative movement between the inside and outside containers; locking between the containers occurs in the position in which door portion 23 of the lateral surface of container 1 is turned upward and passage opening 26 is opposite the outflow slot of the ejector 13.

Figure 3:
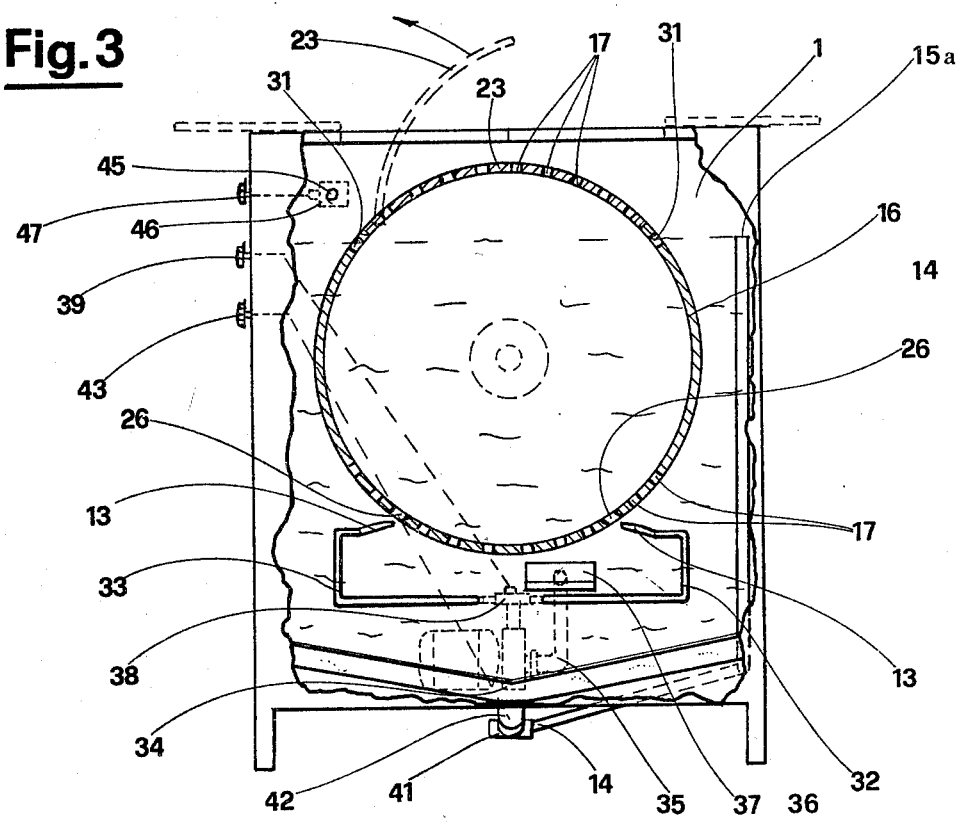
FIG. 3 shows a side view in vertical elevation of a second embodiment of the apparatus in question with parts removed to show others better and parts in section.
Figure 4:
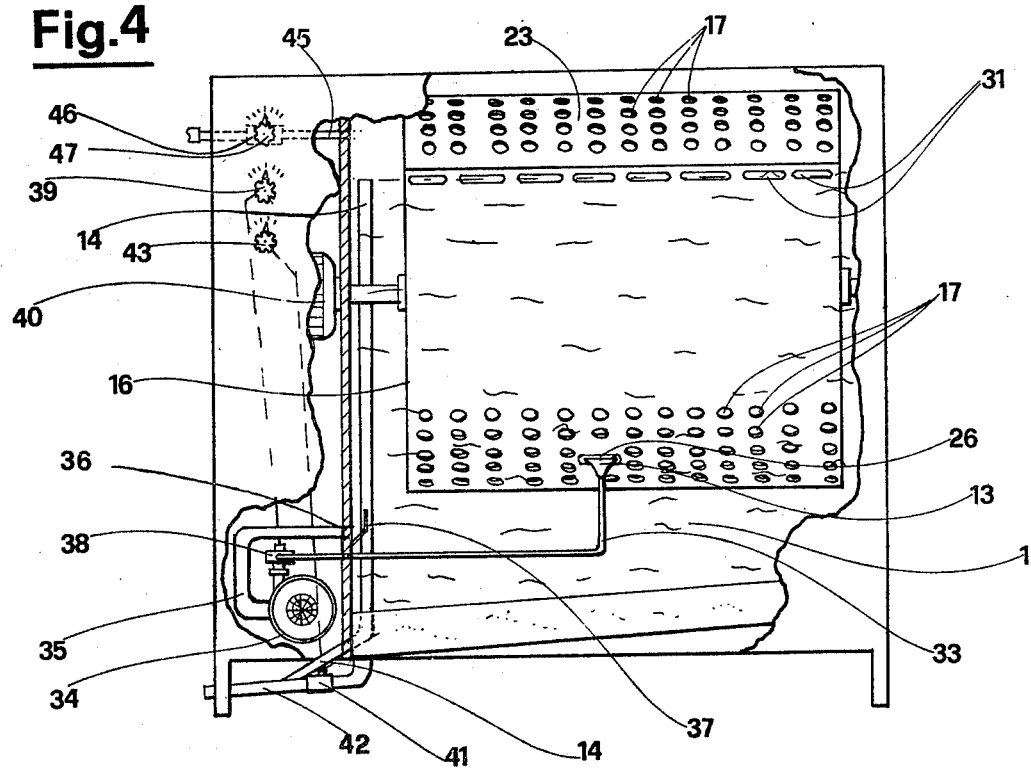
FIG. 4 shows a front view in vertical elevation of a second embodiment of the apparatus in question with parts removed to show others better and with parts in section.

FIGS. 3 and 4 illustrate a second embodiment of the apparatus, provided particularly for communities, canteens, restaurants and for industrial use; in these figures the same numbers as those in FIGS. 1 and 2 correspond to equivalent elements.

This second embodiment comprises ejection means made up of two ejectors 13, placed on opposite sides with respect to basket 16 and connected, by piping 32 and 33 to a source of water under pressure made up of a recycling pump 34; the pump 34 sucks water from stationary container 1 by a suction pipe 35, which comes out into the stationary container by suction slot 36 made in the wall of the stationary container and located behind a protective baffle 37. In addition, means are provided for selective ejection by either of the two ejectors 13; this means comprises a shunting valve 38 operated by a handle 39. Valve 38 also regulates the amount of water sent into either of the ejectors 13. Shunting valve 38 can be an electrovalve operated automatically by a timer that selectively performs ejection by nozzles 13 at preestablished intervals of time.

This second embodiment of the apparatus further comprises: means for putting basket 16 into rotation which comprises a motor 40; second discharge means with which is associated an element to regulate discharge of the water made up of a valve 41 inserted in a discharge pipe 42; the valve 41 is operated by a handle 43; to regulate the change of water during the washing phase there is further provided a regulating valve 46, operated by handle 47, inserted in a pipe 45 connected to stationary container 1 and a water source (not indicated in the figure), for example, the water system.

In the upper part of basket 16 are provided a plurality of slots 31 to facilitate, in the washing phase, evacuation of floating bodies. Functioning of the apparatus is as described below. For an apparatus that is for predominantly domestic use, cover 2 is removed, basket 16 is set and, by removal or opening of door portion 23, the slot for access to the inside of the basket is opened to be able to introduce into the basket itself the products to be washed; water is sent under pressure through pipe 13a of ejector 13 which is normally connected to a tap of the water system. Discharge hole 8 is closed by element 9 whereby in the apparatus the water level increases until it reaches discharge slot 15 a. Element 9 is partially lifted to permit exit of part of the water through discharge hole 8, thus to create a current that carries impurities out; in this way in the washing phase the water leaves the apparatus either by discharge slot 15a or by discharge hole 8.

The water contained in basket 16 assumes a turbulent and swirling movement, created by the sheet stream from ejector 13 which enters the basket through hole 26; this movement of the water stirs the products inside the basket 16; promoting complete removal of foreign bodies associated with the products and performs washing of the products themselves.

Floating foreign bodies leave the basket through the access slot and leave the stationary container through the discharge slot 15a; dirt and heavy bodies leave the basket through holes 17 located at the bottom of the basket and leave the stationary container through discharge hole 8.

Dirty water leaves by slot 15a and hole 8 and is continuously replaced by clean water coming from ejector 13.

When the washing phase is finished, feeding of water by ejector 13 is interrupted and discharge hole 8 is opened completely to empty the water completely from the apparatus; by closing down portion 23, the access slot is closed, cover 2 is placed on the stationary container and the basket is released by removing pin 25 from hole 24 of the basket.

By gripping handle 20, gear wheel 19 is put into rotation which transmits the motion to gear wheel 18 hence to basket 16; by centrifugal force, the water remaining in contact with the products contained in basket 16 leaves the basket through holes 17; in this way the previously washed products are dried.

In contrast with what happens for apparatus for domestic use, in apparatus for industrial use, the water, introduced in the apparatus by pipe 45, is recycled by pump 34 which sucks the water from the stationary container through suction pipe 35 and selectively sends it to one of the ejectors 13'; the alternating function of the ejectors makes it possible to cause, inside basket 16, swirling movements with opposite directions of rotation to perform a more effective washing of the products contained in the basket; suction of heavy bodies, present in the water mass, into pump 34 is prevented by the protective baffle 37. Floating bodies leave the basket through slots 31 made in the upper part of the basket. Change of water inside the apparatus is done by operating either valve 41, which regulates the exit of dirty water and solid impurities or valve 46 which regulates the intake of clean water. Part of the water introduced also leaves by vertical pipe 14 which carries floating bodies with it.

The other operations are conducted as described for the domestic apparatus with the exception of putting basket 16 into rotation which is done by motor 40.

Numerous modifications of a practical and applied nature can be made in the invention, as for example, the second discharge means can be automatically regulated by the water level by floating systems, or the slot for access to the basket can be obtained by making movable portion 23 slide in guides made in the stationary part of lateral surface of the basket, or the system for transmission of rotation movement of the inside basket can be different, without thereby going outside the scope of the inventive idea as claimed below.

I claim:

1. Apparatus for washing and drying food products, in particular vegetables and fruit, comprising: a first stationary container equipped with first and second means for discharge of water; a second container housed in said first container and equipped with a door for the charge and discharge of the food products; a plurality of through holes provided in the side surface of said inside container; stationary ejection means to create a swirling and turbulent flow of water to carry out the washing stage, said ejection means being connected to a source of water under pressure and being housed in said first stationary container but outside said second container near the side surface thereof, which injection means are directed towards the inside of the second container; blocking means for fixing said second container with respect to said first container during the washing stage; control means to rotate, after having disconnected the said blocking means, said second container around a stationary axis, after the washing stage and after the water discharge, for a centrifugal drying of said products; said first water discharge means being suitable to maintain in said stationary container during the washing stage a constant predetermined water level; said second discharge means being suitable to regulate the change of water during the washing stage and to discharge the water from the apparatus after the last washing.

2. Apparatus according to claim 1, wherein said second container is provided with an elongated, slot-shaped opening which, when said second container is fixed with respect to said first container by said blocking means, is disposed in proximity to said ejection means to allow the passage of water flow from said ejection means directly into said second container during the washing stage.

3. Apparatus according to claim 2, wherein said ejection means comprises an ejector having an axially elongated shape so as to eject a stream of water in the form of a sheet, which ejector is housed in the lower part of said first container, said slot opening of the second container having correspondingly an axially elongated shape.

4. Apparatus according to claim 1, wherein said second container is shaped as a cylinder having a substantially horizontal axis, said door of said second container being provided in the cylindrical surface of said second container in position such that, when said second container is fixed with respect to said first container by said blocking means during the washing stage, said door faces upwardly.

5. Apparatus according to claim 1, wherein said ejection means comprise two ejectors housed in the lower part of said first container, on opposite sides with respect to the second container, said two ejectors each having an axially elongated shape to eject respective streams of water in the form of sheets, said second container being provided with two corresponding slot openings having axially elongated shaped openings, means being provided to perform selectively the ejection of water from the one or the other of said two ejectors.

6. Apparatus according to claim 1, wherein said control means comprises a first gear wheel coaxial and solid in rotation with said inside container, said gear wheel meshing with a second gear wheel, supported in a rotatable manner, on the outside, by said first container and put into rotation, manually or by a drive element, around an axis parallel to the axis of the inside container.

7. Apparatus according to claim 1, wherein said first water discharge means comprises a discharge slot in the first container at a height, with respect to the bottom of the first container, slightly lower than the height of said door to the second container, when said second container is in the stationary position; the height of said discharge slot maintaining such a water level as to allow, by said discharge slot, the outflow of foreign floating bodies associated with the products to be washed and to prevent the outflow, by said discharge slot, of the products to be washed.

8. Apparatus according to claim 1, wherein said second water discharge means comprise a discharge hole in the lower part of the bottom of said first container, which discharge hole can be partially closed by means of a movable element acted by an external control to regulate the discharge of the water.

* * * * *